United States Patent
Ojha et al.

[11] Patent Number: 5,930,439
[45] Date of Patent: Jul. 27, 1999

[54] PLANAR OPTICAL WAVEGUIDE

[75] Inventors: Sureshchandra Mishrilal Ojha, Harlow; Terry Bricheno, Great Sampford; Clifford Graham Cureton, Bishops Stortford; Stephen Day, Harlow; David John Moule, Old Harlow, all of United Kingdom

[73] Assignee: Northern Telecom Limited, Montreal, Canada

[21] Appl. No.: 08/942,189

[22] Filed: Oct. 1, 1997

[51] Int. Cl.⁶ ........................................... G02B 6/10
[52] U.S. Cl. .................................................. 385/129
[58] Field of Search ..................... 385/129–131, 385/145, 147; 437/119, 110, 133, 147, 167, 163.2, 189

[56] References Cited

U.S. PATENT DOCUMENTS

| | | | |
|---|---|---|---|
| 5,622,750 | 4/1997 | Kilian et al. | 427/163.2 |
| 5,649,045 | 7/1997 | Fjare et al. | 385/145 |
| 5,682,455 | 10/1997 | Kovacic et al. | 385/131 |
| 5,800,860 | 9/1998 | Kilian et al. | 427/163.2 |

*Primary Examiner*—Akm E. Ullah
*Attorney, Agent, or Firm*—Lee, Mann, Smith, McWilliams, Sweeney & Ohlson

[57] ABSTRACT

A planar optical waveguide comprises at least two cladding layers on a substrate with at least one core layer disposed between the cladding layers. The overcladding layer of the two layers is doped in order to produce a thermal coefficient of expansion close to or equal to that of the substrate in order to reduce the polarisation sensitivity of the device.

8 Claims, 4 Drawing Sheets

PLANAR OPTICAL WAVEGUIDE

BACKGROUND OF THE INVENTION

The present invention relates to a planar optical waveguide and a method for manufacturing the same.

Communication systems utilising optical systems having become common place recently. When first introduced, the optical systems were based on the use of optical fibers which were symmetrically round. More recently however, planar waveguide devices have been introduced due to the ease with which different types of device can be formed utilising techniques learned from semiconductor manufacture. However, planar waveguides frequently exhibit differing refractive indices parallel and perpendicular to the plane of the surface of the substrate. Unpolarised light, which enters a birefringent planar waveguide is split into one component in a direction parallel to and one component in a direction perpendicular to the surface of the substrate of the waveguide and these components propagate at different rates. This makes optical circuits more difficult to design because wavelength—selective elements such as directional couplers or wavelength multiplexers incorporating reflection gratings can be optimally designed for only one polarization direction. This phenomenon is termed by birefringence and in the case of crystalline planar substrates, the birefringence results from the crystalline structure and the selected orientation of the crystals to the plane. Amorphous, transparent materials such as glass do not exhibit birefringence provided they are stress free.

Much attention has therefore been directed to producing low-birefringence planar optical waveguides and the technique normally employed is to manufacture the waveguides from glass on a essentially planar silicon crystal substrate. With this method, the layers of glass are produced at elevated temperature and/or require high temperature treatment in order to ensure homogeneity. The result of the high temperature treatment is that the difference between the thermal expansion co-efficients of the substrate and the layers coated thereon therein leads to considerable stresses on cooling and, in the event of single-sided coating, even to bending of the silicon crystal substrate. Owing to the well known stress-optical effect, these stresses bring about birefringence in the light carrying core of the waveguide. The effect of the birefringence is shown in FIG. 3 where the peak insertion losses in all TE and TM modes occur at different wavelengths.

A number of different proposals have been made to overcome this problem and while some techniques are capable of achieving very low polarisation sensitivity (less than or equal to 0.05 nm for arrayed waveguide demultiplexers) they are not suitable for low cost/high volume production. DE-A-4433738 discloses a technique which is stated to result in low-birefringence and involves making the thermal coefficient of expansion of the optical core material the same as the temperature coefficient of expansion of the silicon substrate. This document is alleged to result in a reduction in the polarisation sensitivity in the region of 0.1 to 0.2 run which is still not sufficiently good for practical purposes.

SUMMARY OF THE INVENTION

It is an object of the present invention to provide a planar optical waveguide device which exhibits low birefringence i.e. low polarisation sensitivity of the order of 0.05 nm or less.

The present invention provides a planar optical waveguide comprising at least two cladding layers including silicon oxide ($SiO_2$) on a silicon substrate and at least one core layer disposed between the cladding layers, including silicon oxide, with a refractive index that is higher than the refractive index of each cladding layer characterised in that the overcladding layer has a thermal coefficient of expansion close to that of the substrate.

It has been found that a device as specified above will produce a polarisation sensitivity of only 0.03 to 0.05 nm.

Preferably, the overcladding is doped with boron and phosphorous containing material in order to produce the desired thermal coefficient of expansion in the overcladding layer.

We have found that the thermal coefficient of expansion of the undercladding and of the optical core material can vary widely from between 10 and 30 E-7 and the device will still exhibit low birefringence.

BRIEF DESCRIPTION OF THE DRAWINGS

In order that the present invention be more readily understood, an embodiment thereof will now be described by way of example only with reference to the accompanying drawings, in which.

DETAILED DESCRIPTION OF PREFERRED EMBODIMENTS

Figure 1:
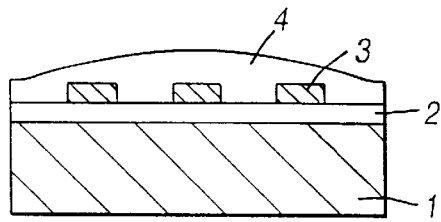
FIG. 1 shows shows a cross sectional side view of a waveguide device according to the present invention.

A planar optical waveguide device as shown in FIG. 1 comprises a substrate 1 usually in the form of a single silicon crystal on which a cladding layer 2 is formed on one side. The layer 2 usually contains silicon dioxide ($SiO_2$) and may be thermally grown or deposited by a process such as PECVD, LPCVD, APCVD or FHD.

The layer 2 is normally more than 10 μm in thickness and is consolidated by annealing at temperatures above 1100° C. One or more optical core elements are formed in a layer 3. Once more the layer 3 contains $SiO_2$ but the refractive index of the layer 3 is higher than the refractive index of the layer 2. Typically the difference in refractive index is of the order of 5E-3 to 20E-3 and is obtained by doping the core layer with germania, phosphorous oxide, boron oxide, or combinations thereof. Thereafter, an overcladding layer 4 is provided which will be seen to cover three sides of the optical core layer 3. The overcladding layer 4 has the same refractive index as the undercladding layer 2 and is formed using any of the techniques mentioned in relation to the undercladding layer 2.

The above structure is basically conventional but the present invention differs from the conventional structure insofar as the overcladding layer 4 is doped with a suitable material so as to achieve a thermal coefficient of expansion which is very close to the thermal coefficient of expansion of the substrate 1. How the doping material is chosen and how the quantity of doping is determined will now be described.

It is known that doping silicon oxide with a dopant such as boron oxide and phosphorous oxide will increase the thermal coefficient of expansion of the material so doped. It is also known that the stress in a layer is related to the thickness T of the layer and the thickness D, module of elasticity E and Poisson coefficient V of the substrate by the equation $\sigma = E.D^2/[6(1-v).R.T]$ where R is the measured curvature of the combination. Using the stress-optical coefficient K, the birefringence B can be obtained since $B = K.\sigma = n_{TE-nTM}$ where $n_{TE}$ is the refractive index of the TE mode and $n_{TE}$ is a refractive index for the TM mode of the optical core. It is known that the stress-optical coefficient K is approximately 3.5 nm/cm/bar for $SiO_2$.

Figure 2:
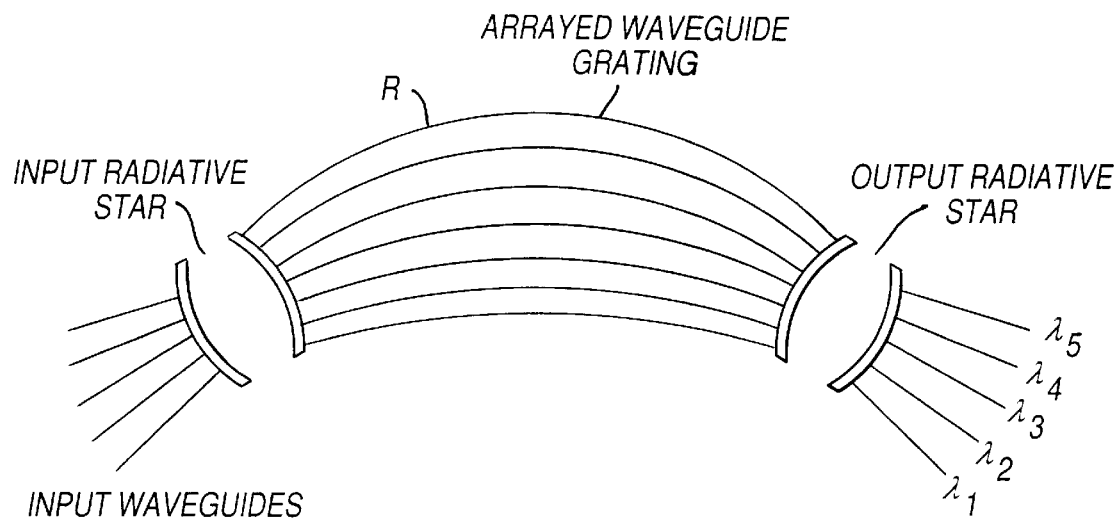
FIG. 2 shows diagrammatically an arrayed grating wavelength demultiplexer.

On the basis of this background information, a test device having the basic structure shown in FIG. 1 was prepared and tested in the configuration shown in FIG. 2. The curvature R of the overcladding was measured using a profilometer. An overcladding layer of thickness 15 μm was used. The amount of doping and the dopent material were changed in successive experiments until the measured curvature indicated that birefringence was reduced to a minimum. It was found on analysis from a satisfactory test that the thermal coefficient of expansion of the overcladding layer for low birefringence was of the same order as the thermal coefficient of expansion of the substrate 1; in other words of the order of 35E-7. Preferably, the doped overcladding layer should be in a state of low compressive stress compared to the substrate, in order to avoid stress cracking due to defects.

Figure 3:
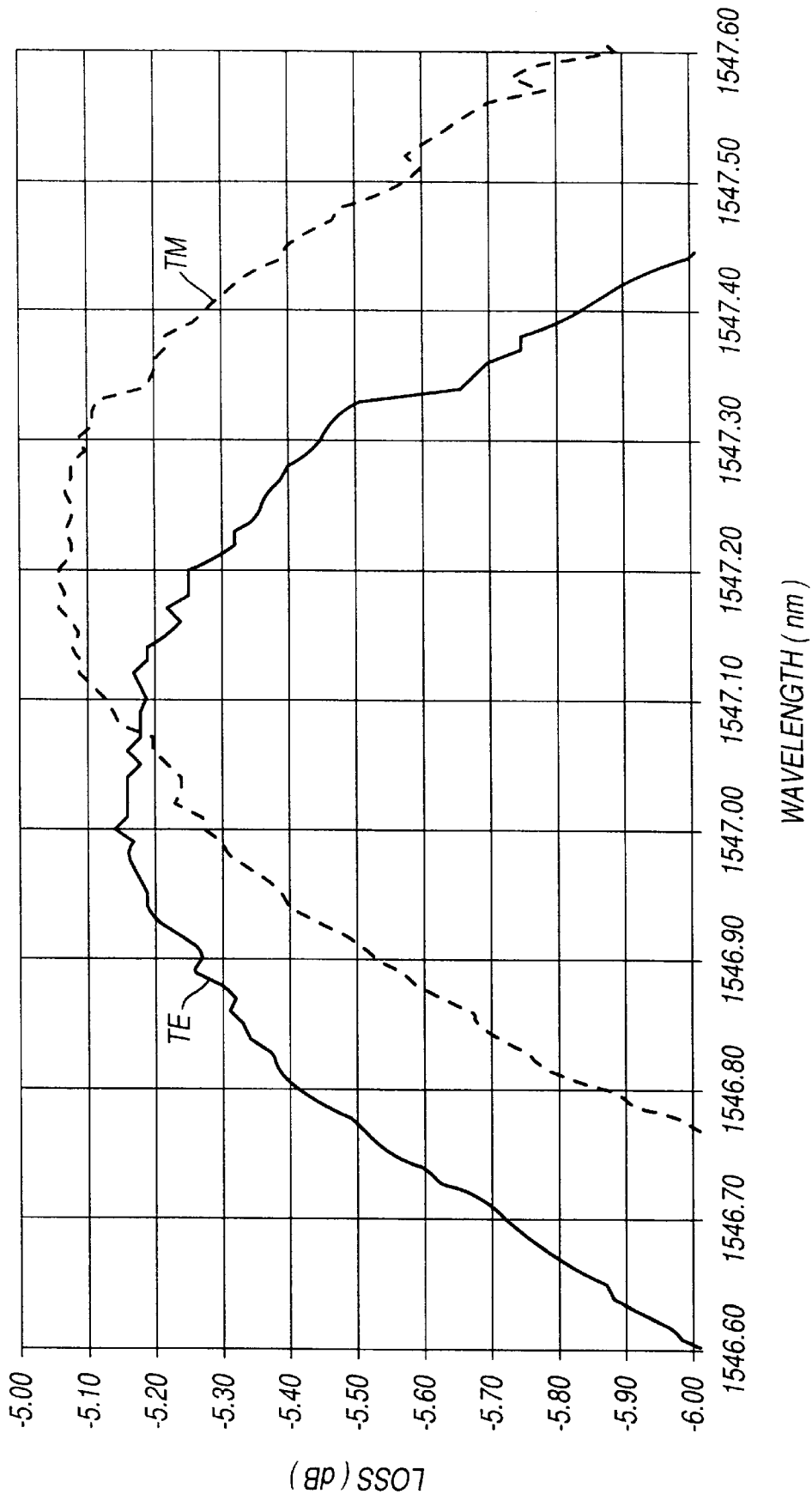
FIG. 3 shows a diagram of insertion loss against wavelength for both the TE and TM modes.

The test also showed that an overcladding layer 4 having a thermal coefficient of expansion of around 28E-7 gave a wavelength shift due to polarisation of the order 0.2 to 0.25 nm which is deemed not satisfactory for practical devices. This is shown in FIG. 3. It was also found that doping the undercladding layer 2 with boron or phosphorous material to produce a thermal coefficient of expansion of the order of 22 E-7 and doping of the core layer 3 with boron phosphorous or germanium containing material to produce thermal coefficients of expantion varying from 13 to 30E-7 showed that without the correct doping of the overcladding 4 to match the thermal coefficient of expansion of the substrate, it was not possible to achieve polarisation sensitivity below 0.1 nm.

Figure 4:
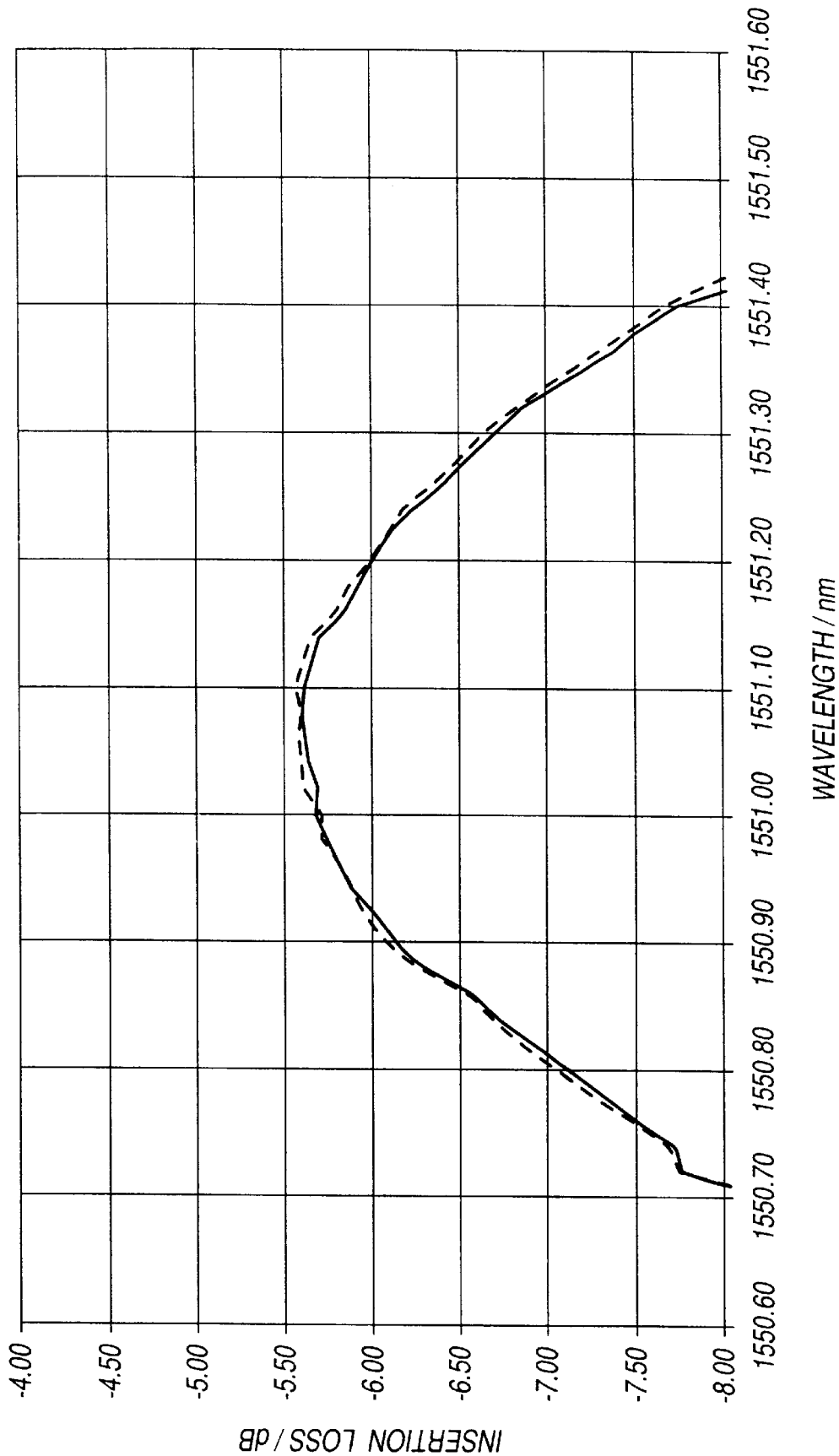
FIG. 4 shows a diagram of insertion loss against wavelength for both the TE and TM modes for a device according to the present invention.

The results of the test were then noted and practical devices produced using the same starting materials as the test but by doping the overcladding layer 4 with the appropriate amount of dopant to produce a thermal coefficient of expansion of the order 35E-7 which is close to that of the silicon substrate. The effect in the graphs of insertion loss for the TE and TM modes as a function of wavelength is shown in FIG. 4.

Further tests have shown that a thermal co-efficient of expansion of 33.8E-7 gave satisfactory results as did 37.3E-7. It is considered advisable to keep the thermal co-efficient of expansion of the overcladding layer 4 to be less than or equal to that of the substrate 1 so that the layer 4 stays in a state of compressive stress.

Figure 5:
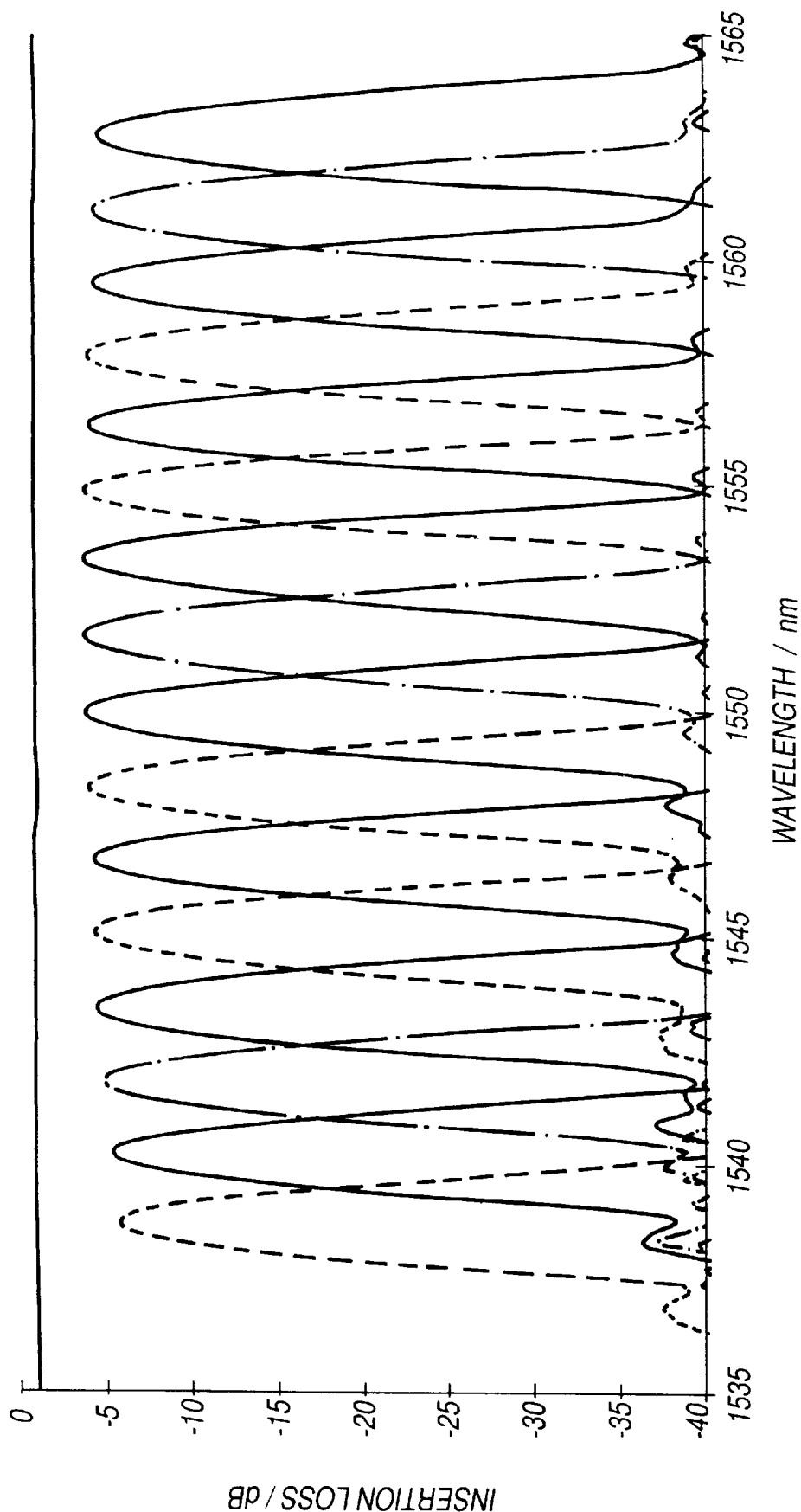
FIG. 5 shows a diagram of insertion loss against wavelength for the TE mode of a 16 channel device according to the present invention.

The benefits of this invention are that 16 channel wavelength demultiplexors can be produced which have insertion losses as shown in FIG. 5. The graphs of insertion loss in this figure are true for both the TE and TM modes.

We claim:

1. A planar optical waveguide comprising at least two cladding layers on a substrate and at least one core layer disposed between the cladding layers, one of the cladding layers comprising an overcladding layer, said core layer having a higher refractive index than the refractive index of the cladding layers, and the overcladding layer having a thermal coefficient of expansion close to or equal to that of the substrate and different from the thermal coefficient of expansion of the core layer.

2. A process for fabricating a planar optical waveguide comprising forming an undercladding layer on a major surface of a substrate, forming a waveguide core on the undercladding layer without regard to the thermal coefficient of expansion of the core, said core having a higher refractive index than the refractive index of the undercladding layer, and forming an overcladding layer, the overcladding layer being doped in order to produce a thermal coefficient of expansion close to or equal to that of the substrate.

3. A process according to claim 2, wherein the substrate is formed of silicon and the layers are provided thereon contain silicon oxide.

4. A process according to claim 3, wherein the overcladding layer is doped with material containing germanium, boron and/or phosphorous.

5. A process according to claim 2, wherein the undercladding layer is doped with material containing germanium, boron and/or phosphorous.

6. A process according to claim 2, wherein each of the layers is formed by a process such as PECVD, LPCVD, APCVD or FHD.

7. A process according to claim 2, wherein the thermal coefficient of expansion of the overcladding layer is substantially equal to but no greater than that of the substrate.

8. A process according to claim 7, wherein the substrate is formed of silicon and the thermal coefficient of expansion of the overcladding layer is in the range 30 to 35E-7.

* * * * *